United States Patent
Long

(10) Patent No.: US 9,114,525 B2
(45) Date of Patent: Aug. 25, 2015

(54) ROBOT ARM ASSEMBLY

(75) Inventor: Bo Long, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 409 days.

(21) Appl. No.: 13/592,620

(22) Filed: Aug. 23, 2012

(65) Prior Publication Data

US 2013/0130855 A1    May 23, 2013

(30) Foreign Application Priority Data

Nov. 21, 2011    (CN) .......................... 2011 1 0370583

(51) Int. Cl.
*F16H 7/02* (2006.01)
*B25J 9/00* (2006.01)
*B25J 9/10* (2006.01)

(52) U.S. Cl.
CPC ................ *B25J 9/0024* (2013.01); *B25J 9/104* (2013.01)

(58) Field of Classification Search
CPC ...................................... F16H 7/02; F16H 7/06
USPC ................. 474/84; 74/490.03, 490.04, 490.05
See application file for complete search history.

(56) References Cited

U.S. PATENT DOCUMENTS

| 4,896,809 A * | 1/1990 | Koyanagi ....................... 226/188 |
| 4,922,727 A * | 5/1990 | Viegas ............................. 62/239 |
| 4,947,702 A * | 8/1990 | Kato ........................... 74/490.03 |
| 2003/0159535 A1 * | 8/2003 | Grover et al. ............... 74/490.04 |

FOREIGN PATENT DOCUMENTS

| DE | 281776 A5 | 8/1990 |
| EP | 2230053 A2 | 9/2010 |
| TW | 201117935 A1 | 6/2011 |
| TW | 201124242 A1 | 7/2011 |

* cited by examiner

*Primary Examiner* — William E Dondero
*Assistant Examiner* — Mark K Buse
(74) *Attorney, Agent, or Firm* — Novak Druce Connolly Bove + Quigg LLP

(57) ABSTRACT

A robot arm assembly includes a first output shaft, a first driving mechanism, a second output shaft and a second driving mechanism. The first driving mechanism includes a first driving motor for driving the first output shaft to rotate, a first driving belt pulley non-rotatably connected to the first output shaft, and a first belt winding on the first driving motor and the first driving belt pulley. The second output shaft is rotatably sleeved in the first output shaft. The second driving mechanism includes a second driving motor for driving the second output shaft to rotate, a second driving belt pulley non-rotatably connected to the second output shaft, and a second belt winding on the second driving motor and the second driving belt pulley.

14 Claims, 3 Drawing Sheets

ROBOT ARM ASSEMBLY

BACKGROUND

1. Technical Field

This disclosure relates to robot arm assemblies, and particularly, to a robot arm assembly using belts for driving and transmission.

2. Description of Related Art

An industrial robot includes a plurality of individual robot arms. A plurality of driving mechanisms is installed in the industrial robot to drive the robot arms to move. The bevel gears are used in the transmission mechanisms to drive the robot arms. However, excessive vibration, impact and noise level are the existing problems for the bevel gears during operation. In addition, lubricating oil is used for maintaining the bevel gears. It is confirmed that the maintenance cost will be improved.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
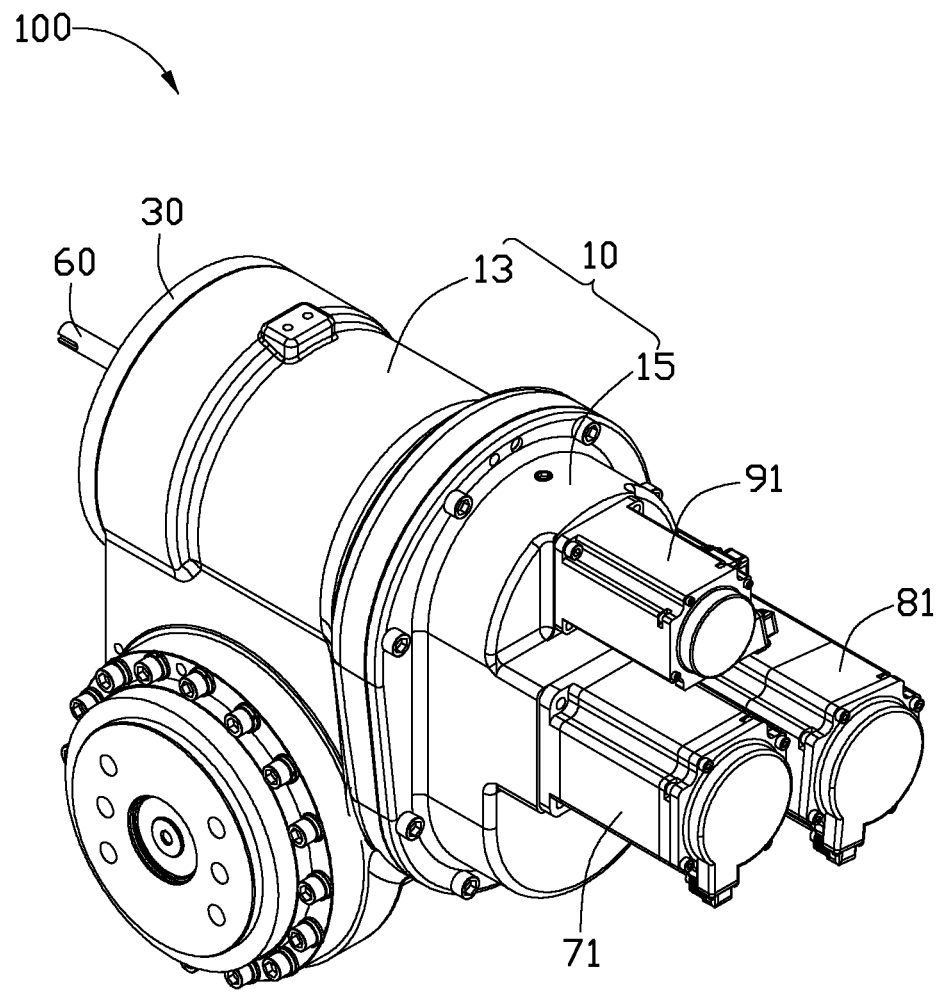
FIG. 1 shows an isometric view of an embodiment of a robot arm assembly.
Figure 2:
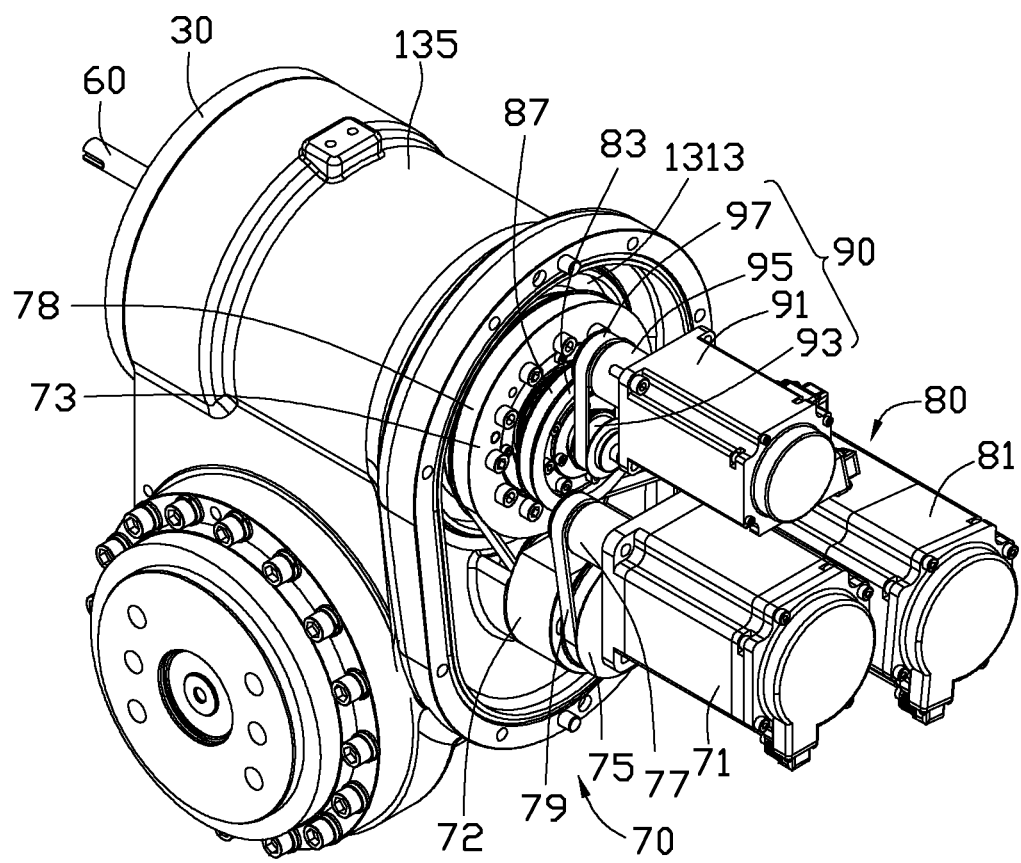
FIG. 2 shows an isometric view of the robot arm assembly of FIG. 1 without a cover.
Figure 3:
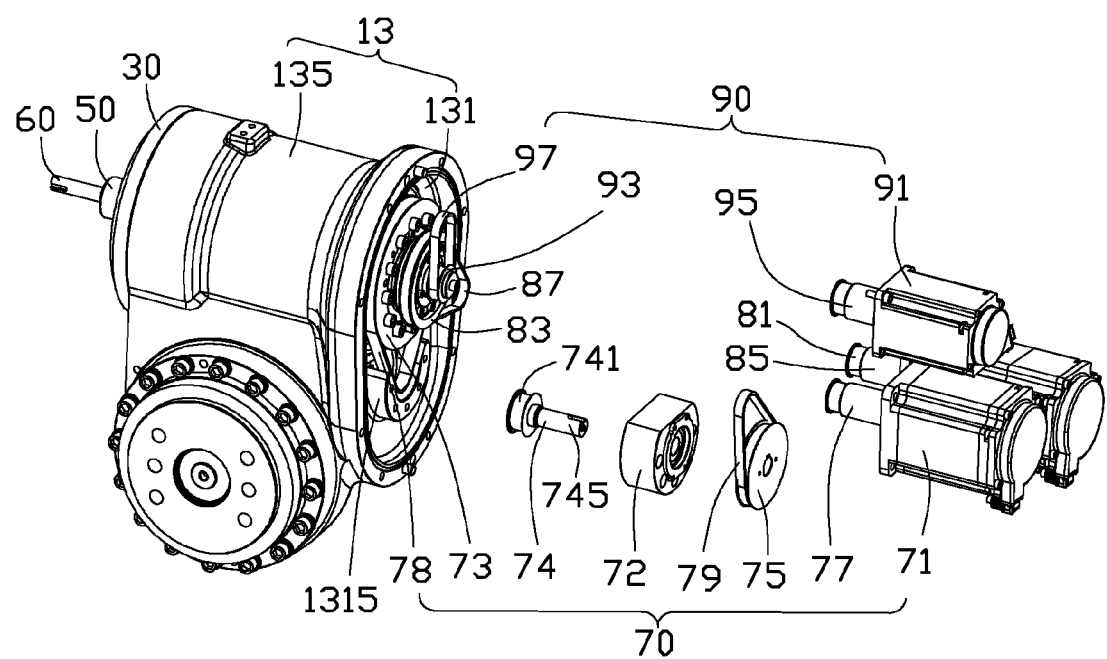
FIG. 3 shows an exploded isometric view of the robot arm assembly of FIG. 2.

Referring to FIGS. 1 through 3 an embodiment of a robot arm assembly 100 is shown. The robot arm assembly 100 includes a housing 10, a first output shaft 30, a second output shaft 50, a third output shaft 60, a first driving mechanism 70, a second driving mechanism 80 and a third driving mechanism 90. The first output shaft 30 is rotatably sleeved on the second output shaft 50 and received in the housing 10. The second output shaft 50 is rotatably sleeved on the third output shaft 60, such that the second output shaft 50 is rotatably located and sandwiched between the first output shaft 30 and the third output shaft 60. The first driving mechanism 70, the second driving mechanism 80 and the third driving mechanism 90 are assembled within the housing 10 for driving first output shaft 30, the second output shaft 50, and the third output shaft 60 to rotate relative to the housing 10. In the illustrated embodiment, the first driving mechanism 70, the second driving mechanism 80 and the third driving mechanism 90 are located on an end of the housing 10 away from the first output shaft 30.

The housing 10 includes an installation base 13 and a cover body 15 detachably mounted to the installation base 13. The installation base 13 includes a mounting wall 131 and a mounting tube 135 substantially perpendicularly protruding from the mounting wall 131. A through hole 1313 is defined in the mounting wall 131. The through hole 1313 is coaxial with the mounting tube 135. An installation portion 1315 is formed on the mounting wall 131 deviating from the mounting tube 135 and under the through hole 1313. The installation portion 1315 is substantially a half-ring. The mounting tube 135 is substantially hollow cylindrical. The cover body 15 is assembled with the mounting wall 131. The cover body 15 and the mounting wall 131 cooperatively form a receiving space (not shown).

The first output shaft 30, the second output shaft 50 and the third output shaft 60 are hollow cylindrical, and are rotatably assembled in the mounting tube 135, respectively. The second output shaft 50 is received in the first output shaft 30, and sleeved on the third output shaft 60. The first output shaft 30, the second output shaft 50 and the third output shaft 60 extend out of an end of the mounting tube 135 away from the mounting wall 131.

The first driving mechanism 70 includes a first driving motor 71, an installation member 72, a first driving belt pulley 73, a first belt wheel 74, a second belt wheel 75, a first belt sleeve 77, a first belt 78 and a transmission belt 79. The first driving motor 71 is mounted on the cover body 15 and extends inward into the receiving space for driving the first driving belt pulley 73. The installation member 72 is substantially a ring with an incision, and is positioned on the installation portion 1315. The first driving belt pulley 73 is non-rotatably connected to the first output shaft 30 at one end thereof adjacent to the through hole 1313 to drive the first output shaft 30 to rotate. The first belt wheel 74 includes a flange portion 741 and a shaft portion 745 connected with the flange portion 741. The shaft portion 745 passes through the installation member 72. The flange portion 741 is sandwiched between the mounting wall 131 and the installation member 72. The second belt wheel 75 sleeves on the shaft portion 745 at one end away from the flange portion 741, and non-rotatably connects to the shaft portion 745. The first belt sleeve 77 is substantially cylindrical, and sleeves on the first driving motor 71. The first belt 78 winds around the first driving belt pulley 73 and the flange portion 741. The transmission belt 79 winds on the second belt wheel 75 and the first belt sleeve 77.

The second driving mechanism 80 includes a second driving motor 81, a second driving belt pulley 83, a second belt sleeve 85 and a second belt 87. The second driving motor 81 is positioned on the cover body 15 adjacent to the first driving motor 71 and extends inward into the receiving space for driving the second driving belt pulley 83. The second driving belt pulley 83 is non-rotatably connected to the second output shaft 50. The second belt sleeve 85 sleeves on the second driving belt pulley 83. The second belt 87 winds around the second driving belt pulley 83 and the second belt sleeve 85.

The third driving mechanism 90 includes a third driving motor 91, a third driving belt pulley 93, a third belt sleeve 95 and a third belt 97. The third driving motor 91 is positioned on the cover body 15 above of the first driving motor 71 and the second driving motor 81, and extends inward into the receiving space for driving the third driving belt pulley 93. The third driving belt pulley 93 is non-rotatably connected to the third output shaft 60. The third belt sleeve 95 sleeves on the third driving belt pulley 93. The third belt 97 winds on the third driving belt pulley 93 and the third belt sleeve 95.

In use, the first driving motor 71 drives the first, second belt wheels 74, 75 to rotate via the first belt sleeve 77 and the transmission belt 79. The first belt wheel 74 drives the first driving belt pulley 73 to rotate via the first belt 78. Such that, the first output shaft 30 is driven to rotate. The second driving motor 81 drives the second driving belt pulley 83 to rotate via the second belt sleeve 85 and the second belt 87, thus, the second output shaft 50 rotates. The third driving motor 91 drives the third driving belt pulley 93 to rotate via the third belt sleeve 95 and the third belt 97. Then the third output shaft 60 is driven to rotate.

Compared with conventional bevel gears driving mechanisms, the belt driving members with simpler structure produce minimal vibration and noise when in use. In addition, the belt members do not need the lubricating oil, thereby decreasing the manufacturing cost of robot arm assembly 100.

The number of the output shafts and the driving mechanisms is not limited to three of the illustrated embodiment, the number of the output shafts and the driving mechanisms can be varied depend on actual needs. Namely, the robot arm assembly 100 may include at least one output shaft and at least one driving mechanism.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A robot arm assembly comprising:
    a housing comprising an installation base, the installation base comprising a mounting wall and a mounting tube protruding from the mounting wall;
    a first output shaft;
    a first driving mechanism comprising a first driving motor for driving the first output shaft to rotate, a first driving belt pulley non-rotatably connected to the first output shaft, and a first belt winding on the first driving motor and the first driving belt pulley;
    a second output shaft rotatably sleeved in the first output shaft; and
    a second driving mechanism comprising a second driving motor for driving the second output shaft to rotate, a second driving belt pulley non-rotatably connected to the second output shaft, and a second belt winding on the second driving motor and the second driving belt pulley;
    wherein the first output shaft and the second output shaft are rotatably located within the mounting tube, the first driving belt pulley and the second driving belt pulley are positioned adjacent to the mounting wall; and
    wherein the first driving mechanism further comprises a first belt wheel, a second belt wheel and a transmission belt; the first belt wheel is rotatably positioned on the mounting wall, the second belt wheel is non-rotatably connected to the first belt wheel, and the transmission belt winds on the first driving motor via the first belt wheel and the second belt wheel.

2. The robot arm assembly of claim 1, wherein the first belt wheel comprises a flange portion and a shaft portion connected with the flange portion, the second belt wheel sleeves on the shaft portion and is non-rotatably connected to the shaft portion, the first belt winding on the flange portion.

3. The robot arm assembly of claim 2, wherein the first driving mechanism further comprises an installation member, an installation portion is formed on the mounting wall, the installation member is positioned on the installation portion, the shaft portion passes through the installation member, the flange portion is positioned and sandwiched between the mounting wall and the installation member.

4. The robot arm assembly of claim 1, further comprising a first belt sleeve sleeved on the first driving motor, the transmission belt winds on the first driving motor via the first belt sleeve.

5. The robot arm assembly of claim 1, wherein the second driving mechanism further comprises a second belt sleeve sleeved on the second driving motor, the second belt winds on the second driving motor via the second belt sleeve.

6. The robot arm assembly of claim 1, further comprising a third driving mechanism, wherein the third driving mechanism comprises a third output shaft rotatably received in the second output shaft, a third driving motor for driving the third output shaft to rotate; a third driving belt pulley non-rotatably connected to the third output shaft and positioned adjacent to the mounting wall, and a third belt winding on the third driving motor and the third driving belt pulley.

7. The robot arm assembly of claim 6, further comprising a third belt sleeve sleeved on the third driving motor, wherein the third belt winds on the third driving motor via the third belt sleeve.

8. The robot arm assembly of claim 1, further comprising a cover body mounted on the mounting wall away from the mounting tube, wherein the cover body and the mounting wall cooperatively form a receiving space, the first driving belt pulley and the second driving belt pulley are received in the receiving space, the first driving motor and the second driving motor are mounted on the cover body and extend inward into the receiving space.

9. A robot arm assembly comprising:
    a housing comprising an installation base, the installation base comprising a mounting wall and a mounting tube protruding from the mounting wall;
    a first output shaft;
    a first driving mechanism comprising a first driving motor for driving the first output shaft to rotate, a first driving belt pulley non-rotatably connected to the first output shaft, and a first belt winding on the first driving motor and the first driving belt pulley;
    a second output shaft rotatably sleeved in the first output shaft;
    a second driving mechanism comprising a second driving motor for driving the second output shaft to rotate, a second driving belt pulley non-rotatably connected to the second output shaft, and a second belt winding on the second driving motor and the second driving belt pulley;
    a third output shaft rotatably sleeved in the second output shaft;
    a third driving mechanism comprising a third driving motor for driving the third output shaft to rotate, a third driving belt pulley non-rotatably connected to the third output shaft, and a third belt winding on the third driving motor and the third driving belt pulley;
    wherein the first output shaft and the second output shaft are rotatably located within the mounting tube, the first driving belt pulley, the second driving belt pulley and the third driving belt pulley are positioned adjacent to the mounting wall; and
    wherein the first driving mechanism further comprises a first belt wheel, a second belt wheel and a transmission belt; the first belt wheel is rotatably positioned on the mounting wall, the second belt wheel is non-rotatably connected to the first belt wheel, the transmission belt winds on the first driving motor via the first belt wheel and the second belt wheel.

10. The robot arm assembly of claim 9, wherein the first belt wheel comprises a flange portion and a shaft portion connected with the flange portion, the second belt wheel sleeves on the shaft portion and is non-rotatably connected to the shaft portion, the first belt winding on the flange portion.

11. The robot arm assembly of claim 10, wherein the first driving mechanism further comprises an installation member, an installation portion is formed on the mounting wall, the installation member is positioned on the installation portion, the shaft portion passes through the installation member, the flange portion is positioned and sandwiched between the mounting wall and the installation member.

12. The robot arm assembly of claim 9, further comprising a first belt sleeve sleeved on the first driving motor, wherein the transmission belt winds on the first driving motor via the first belt sleeve.

13. The robot arm assembly of claim 9, wherein the second driving mechanism further comprises a second belt sleeve sleeved on the second driving motor, the second belt winds on the second driving motor via the second belt sleeve.

14. The robot arm assembly of claim 9, further comprising a cover body mounted on the mounting wall away from the mounting tube, wherein the cover body and the mounting wall cooperatively form a receiving space, the first driving belt pulley, the second driving belt pulley and the third driving belt pulley are received in the receiving space, the first driving motor, the second driving motor and the third driving motor are mounted on the cover body and extend inward into the receiving space.

* * * * *